(12) United States Patent
Abe

(10) Patent No.: US 9,539,504 B2
(45) Date of Patent: Jan. 10, 2017

(54) STORAGE MEDIUM STORING GAME PROGRAM, GAME DEVICE, GAME SYSTEM, AND GAME PROCESS METHOD

(71) Applicant: NINTENDO CO., LTD., Kyoto (JP)

(72) Inventor: Goro Abe, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 615 days.

(21) Appl. No.: 13/916,043

(22) Filed: Jun. 12, 2013

(65) Prior Publication Data

US 2014/0206422 A1 Jul. 24, 2014

(30) Foreign Application Priority Data

Jan. 22, 2013 (JP) .................................. 2013-009146

(51) Int. Cl.
| | |
|---|---|
| *A63F 9/24* | (2006.01) |
| *A63F 13/00* | (2014.01) |
| *A63F 13/2145* | (2014.01) |
| *A63F 13/814* | (2014.01) |
| *A63F 13/60* | (2014.01) |
| *A63F 13/46* | (2014.01) |

(Continued)

(52) U.S. Cl.
CPC ........... *A63F 13/2145* (2014.09); *A63F 13/44* (2014.09); *A63F 13/46* (2014.09); *A63F 13/60* (2014.09); *A63F 13/814* (2014.09); *A63F 13/214* (2014.09); *A63F 2300/1068* (2013.01); *A63F 2300/1075* (2013.01); *A63F 2300/8047* (2013.01); *G10H 2210/076* (2013.01)

(58) Field of Classification Search
CPC ................... G10H 2210/076; G10H 2210/101; G10H 2210/341; A63F 2300/8047; A63F 13/814; A63F 13/5375

USPC ................................................ 463/7, 31, 35
See application file for complete search history.

(56) References Cited

U.S. PATENT DOCUMENTS 3,897,711 A * 8/1975 Elledge ................. G09B 15/02
                                                      84/479 R
6,347,998 B1   2/2002 Yoshitomi et al.
(Continued)

FOREIGN PATENT DOCUMENTS

| JP | 2000-300838 | 10/2000 |
|---|---|---|
| JP | 2000-350861 | 12/2000 |

(Continued)

OTHER PUBLICATIONS

Dance Dance Revolution 2nd MIX, GAMEST, Kabushiki Kaisha Shinseisha, Mar. 15, 1999, vol. 14, No. 10, Serial No. 253, p. 104 (3 pages).

(Continued)

*Primary Examiner* — Steven J Hylinski
(74) *Attorney, Agent, or Firm* — Nixon & Vanderhye PC

(57) ABSTRACT

An example of a game device accepts inputs from a plurality of players to allow a game to progress. First, the game device accepts a first rhythm input by a first player. A model rhythm is generated and presented based on the first rhythm input. The game device accepts a second rhythm input by a second player. Then, the game device evaluates the second rhythm input using as a reference the model rhythm. Thus, by generating a model rhythm based on a rhythm which is input by a player, it is possible to provide a game with a high playability having an increased degree of freedom for the model rhythm.

20 Claims, 8 Drawing Sheets

(51) Int. Cl.
*A63F 13/44* (2014.01)
*A63F 13/214* (2014.01)

(56) References Cited

U.S. PATENT DOCUMENTS

| | | | |
|---|---|---|---|
| 6,379,244 B1 | 4/2002 | Sagawa et al. | |
| 6,450,888 B1 | 9/2002 | Takase et al. | |
| 6,461,239 B1 | 10/2002 | Sagawa et al. | |
| 6,645,067 B1* | 11/2003 | Okita | A63F 13/005 434/307 A |
| 7,351,148 B1* | 4/2008 | Rothschild | A63F 9/24 463/1 |
| 7,507,893 B2* | 3/2009 | Knudsen | G09B 15/023 434/227 |
| 7,758,427 B2* | 7/2010 | Egozy | A63F 13/12 463/31 |
| 8,702,485 B2* | 4/2014 | Flury | A63F 13/10 463/34 |
| 8,721,441 B1* | 5/2014 | Chen | A63F 13/814 463/35 |
| 2003/0066414 A1* | 4/2003 | Jameson | G10H 3/125 84/741 |
| 2005/0085297 A1* | 4/2005 | Onoda | A63F 13/10 463/37 |
| 2005/0101364 A1* | 5/2005 | Onoda | A63F 13/10 463/7 |
| 2007/0221048 A1* | 9/2007 | Li | G10H 1/361 84/616 |
| 2009/0258703 A1* | 10/2009 | Brunstetter | A63F 13/12 463/36 |
| 2010/0029386 A1* | 2/2010 | Pitsch | A63F 13/12 463/35 |
| 2010/0137049 A1* | 6/2010 | Epstein | A63F 13/06 463/7 |
| 2010/0210359 A1* | 8/2010 | Krzeslo | A63F 13/10 463/31 |
| 2010/0309136 A1* | 12/2010 | Liu | G06F 3/0231 345/169 |
| 2011/0151975 A1 | 6/2011 | Mori | |
| 2011/0281622 A1 | 11/2011 | Ryu | |
| 2012/0302339 A1 | 11/2012 | Kimura et al. | |
| 2014/0051512 A1* | 2/2014 | Rasanen | A63F 13/00 463/31 |

FOREIGN PATENT DOCUMENTS

| | | |
|---|---|---|
| JP | 2001-9152 | 1/2001 |
| JP | 2001-276291 | 10/2001 |
| JP | 2007-259881 | 10/2007 |
| JP | 2011-240138 | 12/2011 |
| JP | 2012-239794 | 12/2012 |

OTHER PUBLICATIONS

Ken Fujimoto, Cubase 6.5 Series Complete Operation Guide for Windows/MacOS/Cubase/Cubase Artist, Rittor Music, Inc., Dec. 1, 2012, 2nd edition, pp. 192-194 (6 pages).

Office Action mailed on Nov. 16, 2016 for corresponding Japanese Patent Application No. JP2013-009146 and its English Translation (10 pages).

* cited by examiner

| TIMING INFORMATION | TYPE INFORMATION |
|---|---|
| UNIT PERIOD a | FIRST BUTTON IMAGE |
| UNIT PERIOD b | SECOND BUTTON IMAGE |
| UNIT PERIOD c | THIRD BUTTON IMAGE |
| ⋮ | ⋮ |

F I G. 1 1
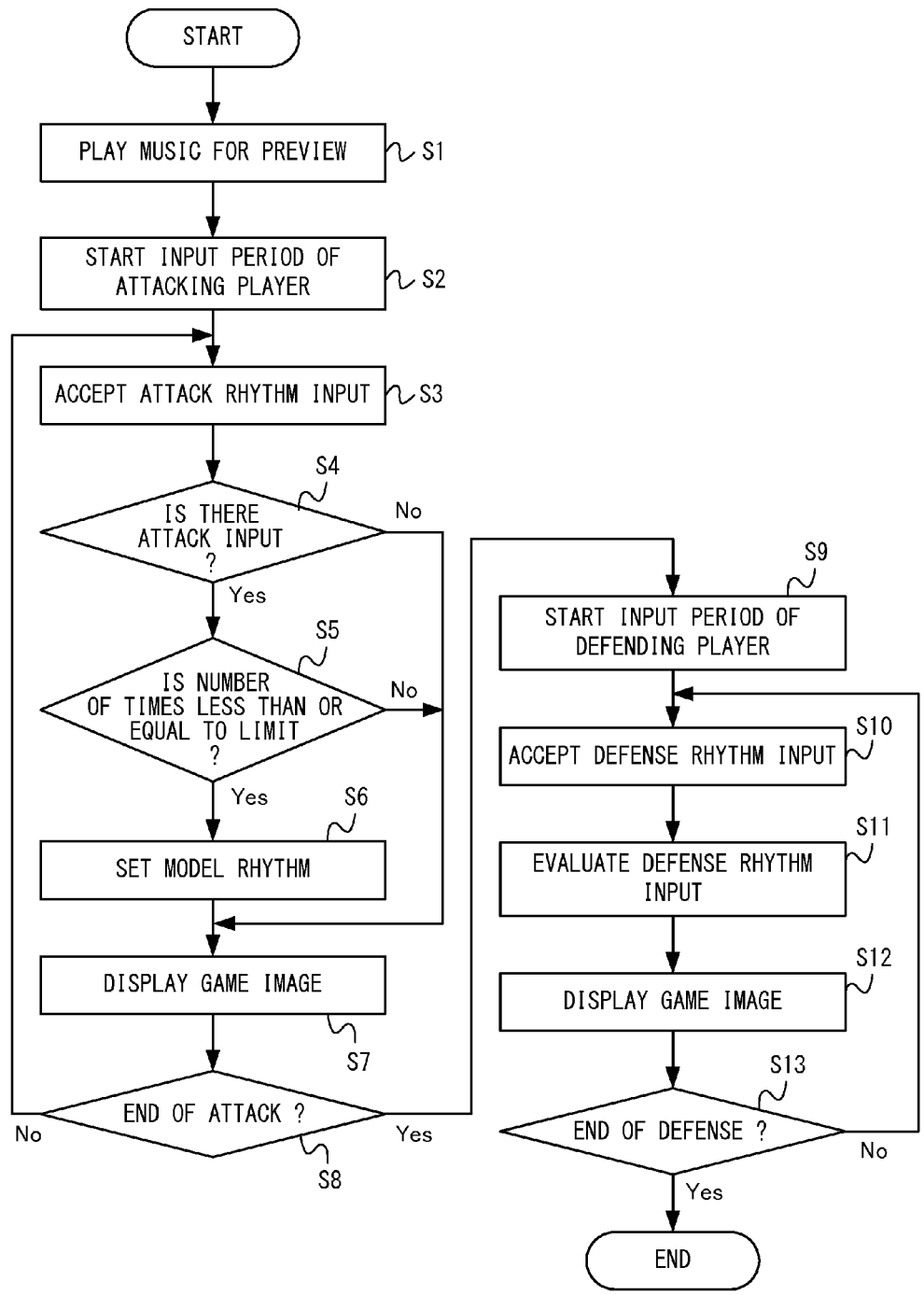

F I G. 1 2
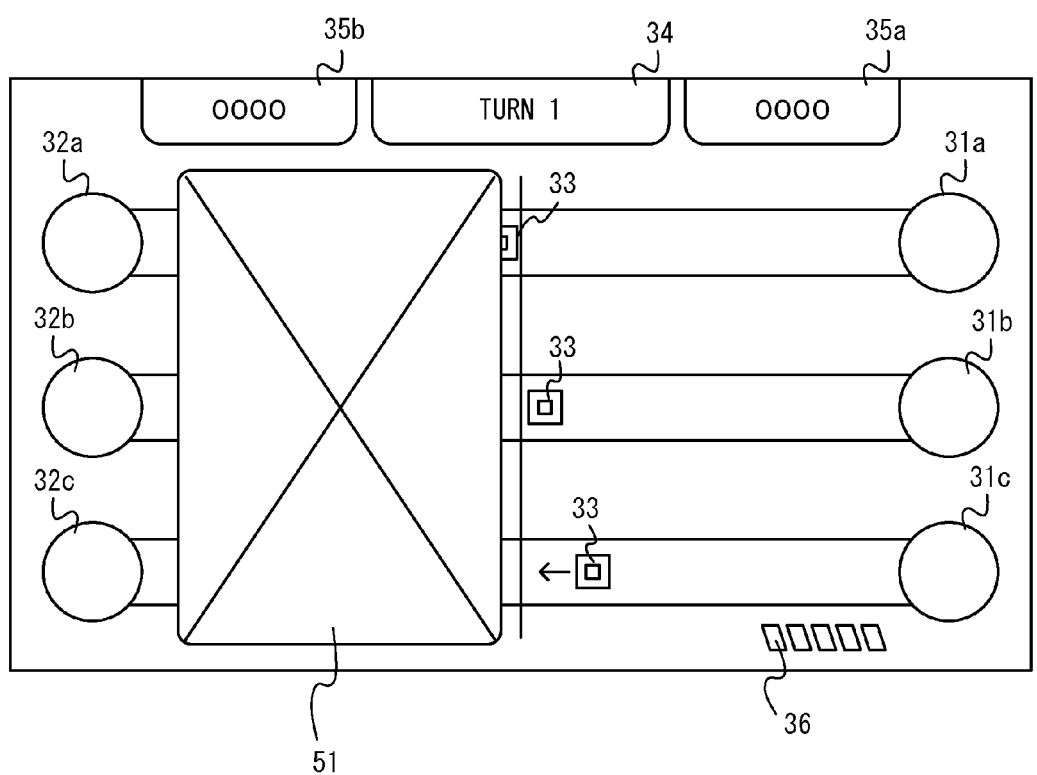

STORAGE MEDIUM STORING GAME PROGRAM, GAME DEVICE, GAME SYSTEM, AND GAME PROCESS METHOD

CROSS REFERENCE TO RELATED APPLICATION

The disclosure of Japanese Patent Application No. 2013-9146 filed on Jan. 22, 2013 is herein incorporated by reference.

FIELD

The technology herein relates to a storage medium storing a game program, a game device, a game system, and a game process method, for a multi-player game.

BACKGROUND AND SUMMARY

There have been games of a genre called music games or rhythm games. In games of this genre, gameplay is evaluated based on the relationship between a timing predetermined for each piece of music (song) and the player's input timing.

In such conventional games, since the reference timing for evaluation is predetermined, there is little freedom for the reference for evaluation, and the player may get easily bored.

Thus, the present application discloses a storage medium storing a game program, a game device, a game system, and a game process method for a game with a higher playability.

(1)

An example of a non-transitory computer-readable storage medium described in the present specification stores a game program to be executed by a computer of a game device which accepts inputs from a plurality of players to allow a game to progress. The game program instructs the computer to function as a first input-accepting unit, a model generation unit, a second input-accepting unit, and an evaluation unit. The first input-accepting unit accepts a first rhythm input by a first player. The model generation unit generates and presents a model rhythm based on the first rhythm input. The second input-accepting unit accepts a second rhythm input by a second player. The evaluation unit evaluates the second rhythm input using as a reference the model rhythm.

With configuration (1) above, the model rhythm is generated based on the rhythm input by the first player, and the second player makes a rhythm input so as to conform with the model rhythm. Thus, since the model rhythm itself is input by a player, there is an increased degree of freedom for the model rhythm. Therefore, it is possible to provide a game with a higher playability, of which the players will not easily get bored.

(2)

The model generation unit may generate the model rhythm so that a timing of the model rhythm coincides with any of one or more basic timings predetermined within a predetermined input period.

With configuration (2) above, it is possible to prevent the model rhythm generated based on the first rhythm input made by the first player from becoming too hard, and to improve the playability of the game.

(3)

The model generation unit may generate the model rhythm by correcting a timing of the first rhythm input so that the timing coincides with any of the basic timings.

With configuration (3) above, it is possible to easily generate a model rhythm that reflects the first rhythm input made by the first player and that is in conformity with the basic timings.

(4)

Of all the input timings of the first rhythm input, the model generation unit may exclude any input timing that is outside a predetermined period including a basic timing therein, and generate the model rhythm based on one or more remaining input timings.

With configuration (4) above, since one or more of the first rhythm inputs that are not in conformity with the rhythm composed of the basic timings are excluded, it is possible to generate a model rhythm that is in conformity with the rhythm composed of the basic timings.

(5)

The model generation unit may generate the model rhythm by changing at least a tempo of the first rhythm input.

With configuration (5) above, the second player will make rhythm inputs at a tempo different from the first player, and it is therefore possible to adjust the difficulty level of the rhythm input and to improve the playability of the game.

(6)

The model generation unit may set a timing in the model rhythm based on the first rhythm input. The evaluation unit may perform the evaluation by comparing a timing in the model rhythm with a timing of the second rhythm input.

With configuration (6) above, it is possible to easily evaluate a defense rhythm input using as a reference the model rhythm.

(7)

The first input-accepting unit may accept a plurality of types of inputs as the first rhythm input. The second input-accepting unit may accept a plurality of types of inputs as the second rhythm input. The model generation unit may set a timing in the model rhythm based on a timing of an input in the first rhythm input, and may set a type of an input to be made at the timing in the model rhythm based on a type of an input in the first rhythm input. The evaluation unit may perform the comparison between a timing in the model rhythm and a timing of the second rhythm input separately for each type of input.

With configuration (7) above, the player makes a rhythm input while taking into consideration the type of input as well as the timing of input of the rhythm input. Then, it is possible to increase the variation of inputs, and to improve the playability of the game.

(8)

The second input-accepting unit may further accept a third rhythm input by the second player after the evaluation of the second rhythm input using as a reference the model rhythm based on the first rhythm input. The model generation unit may further generate and present a model rhythm based on the third rhythm input. The first input-accepting unit may further accept a fourth rhythm input by the first player after the model rhythm is generated based on the third rhythm input. The evaluation unit may evaluate the fourth rhythm input using as a reference the model rhythm based on the third rhythm input.

With configuration (8) above, each player can experience the gameplay as a player who makes rhythm inputs so as to generate a model rhythm, and can also experience the gameplay as a player who makes rhythm inputs to the model rhythm. Thus, it is possible to further improve the playability of the game.

(9)

The game device may be capable of accepting an input from a predetermined input device. The first input-accepting unit may accept an input from the input device as the first rhythm input. The second input-accepting unit may accept another input from the same input device, from which the first rhythm input is accepted, as the second rhythm input.

With configuration (9) above, players can play the game using a single input device. That is, since it is not necessary to provide a plurality of input devices, it is possible to simplify the configuration of the game device (game system).

(10)

The first input-accepting unit may accept an input from a touch panel provided on the input device as the first rhythm input. The second input-accepting unit may accept another input from the same touch panel, from which the first rhythm input is accepted, as the second rhythm input.

With configuration (10) above, players can easily make rhythm inputs using the touch panel while looking at the game image. Moreover, as a plurality of players make game inputs using a single touch panel, the players are allowed to more clearly feel that they are playing the game together by either competing against each other or cooperating with each other. This increases the realistic feel of the game, and improves the playability of the game.

(11)

The game program may instruct the computer to function further as a display control unit for displaying an image representing the model rhythm on a screen provided together with the touch panel, and displaying the image on another display device separate from the input device.

With configuration (11) above, the game image is displayed also on a screen (a separate display device) other than the screen on which touch inputs are made. Thus, it is possible to present a game image in an easy-to-view manner for the players. It is also possible to present a game image in an easy-to-view manner for other people watching the game.

(12)

The game program may instruct the computer to function further as a display control unit for displaying an image representing the model rhythm on a display device.

With configuration (12) above, a player can check the model rhythm, thereby making it easier to make rhythm inputs.

(13)

The game program may instruct the computer to function further as a music playback unit for playing music during an input period in which the first rhythm input is accepted, and during another input period in which the second rhythm input is accepted.

With configuration (13) above, it is possible to present, to the player, a so-called "music game (rhythm game)" in which the player inputs a rhythm to the music. That is, by allowing the player to make rhythm inputs to the music, it is easier for the player to make those inputs, and it is thus possible to improve the playability of the game.

Note that the present specification also discloses an example game device and an example game system including units equivalent to those that are implemented by executing the game program of (1) to (13) above. The present specification also discloses an example game process method to be carried out in (1) to (13) above.

With the storage medium storing a game program, the game device, the game system and the game process method set forth above, a model rhythm is generated based on rhythm inputs made by a player, and it is therefore possible to present a game with a high playability having an increased degree of freedom for the model rhythm.

These and other objects, features, aspects and advantages will become more apparent from the following detailed description when taken in conjunction with the accompanying drawings.

BRIEF DESCRIPTION OF THE DRAWINGS

FIG. 11 is a flow chart showing an example of a flow of a game process to be performed by a control section of a game device; and FIG. 12 is a diagram showing an example of a game image according to a variation of the present embodiment.

DETAILED DESCRIPTION OF NON-LIMITING EXAMPLE EMBODIMENTS

1. Configuration of Information Processing System

Figure 1:
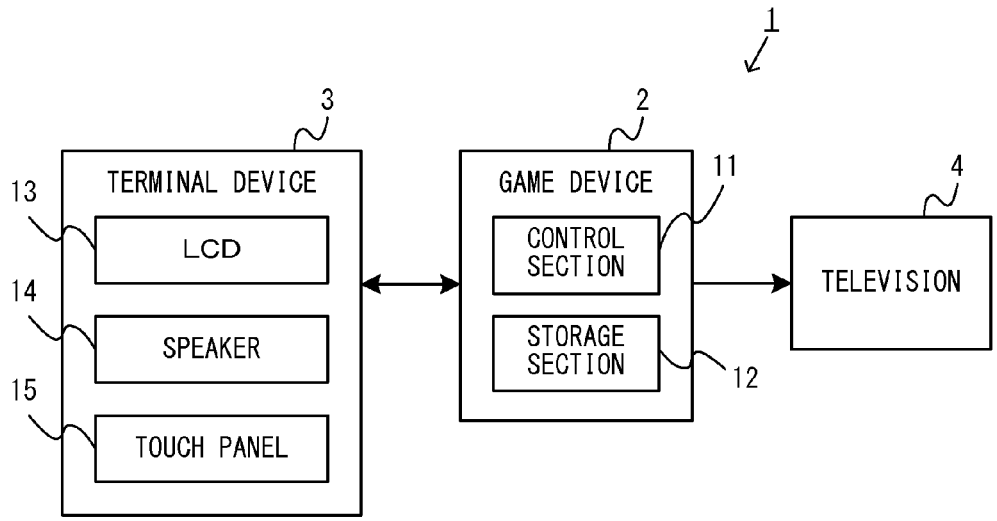
FIG. 1 is a block diagram showing a non-limiting example of a game system according to the present embodiment.

A game program, a game device, a game system, and a game process method according to an example embodiment. FIG. 1 is a block diagram showing an example of a game system according to the present embodiment. In FIG. 1, a game system 1 includes a game device 2, a terminal device 3 and a television 4. In the present embodiment, the game system 1 performs a game process based on inputs from players, and displays game images on a display device (the terminal device 3 and/or the television 4).

The game system 1 includes the game device 2. The game device 2 performs a game process to be performed on the game system 1. The game device 2 may be an information processing device of any form, such as a personal computer, a portable terminal, a smart phone, and the like, as well as an information processing device dedicated for the game process. The game device 2 is capable of communicating with the terminal device 3 and the television 4. Note that the communication connection between the game device 2 and the terminal device 3 or the television 4 may be wired or wireless.

As shown in FIG. 1, the game device 2 includes a control section 11 for performing the game process. The control section 11 includes a CPU and a memory. The CPU uses the memory to perform a predetermined game program (FIG. 11), thereby performing an information process (game process) on the game device 2. Note that the game device 2 may be of any configuration as long as it is capable of performing the game process, and a part or whole of the game process, for example, may be performed by a dedicated circuit. In the present embodiment, through the game process, a game image is output from the game device 2 to the terminal device 3 and/or the television 4, which are display devices. The game device 2 may output a game sound, which should be output along with the game image, to the terminal device 3 and/or the television 4.

The game device 2 includes a storage section 12. The storage section 12 may be any storage unit that can be accessed by the control section 11. The storage section 12 may be a storage device provided in the game device 2, such as a hard disk, for example, or may be a storage medium that can be attached/detached to/from the game device 2, such as an optical disc, for example. The storage section 12 stores a game program. The details of the game process to be performed by the game program will be described later (see FIG. 11).

The game system 1 includes the terminal device 3. The terminal device 3 includes an LCD (liquid crystal display device) 13, which is an example of a display section. In the present embodiment, the terminal device 3 is a portable display device. The terminal device 3 receives an image (movie) transmitted from the game device 2, and displays the image on the LCD 13.

The terminal device 3 includes a speaker 14, which is an example of the sound output section. The terminal device 3 receives game sound data transmitted from the game device 2, and outputs a game sound from the speaker 14.

The terminal device 3 includes an input section. The input section accepts an operation of a user, and outputs operation data representing the operation of the user. That is, the terminal device 3 can be said to be an input device (controller). In the present embodiment, the terminal device 3 includes a touch panel 15 as an example of the input section. The touch panel 15 is provided on the screen of the LCD 13. The terminal device 3 may include an input section such as an analog stick, a cross key and/or a button, for example, in addition to (or instead of) the touch panel 15. The input section may be a device capable of detecting an operation of moving the terminal device 3, such as an attitude sensor (an acceleration sensor, a gyrosensor, or the like), for example. The terminal device 3 transmits operation data output from the input section (herein, the touch panel 15) to the game device 2. Thus, the game device 2 is capable of accepting an input from the terminal device 3, which is an input device.

As described above, in the present embodiment, the display device and the controller device are configured as an integral member. Note however that in other embodiments, the display device and the controller device may be provided as separate members.

The television 4 is an example of a display device for displaying an image. The television 4 is an example of a stationary display device. Where an image is transmitted from the game device 2 to the television 4, the television 4 displays the image. The television 4 may includes a speaker. Where a sound is transmitted from the game device 2 to the television 4, the speaker outputs the sound.

Thus, in the present embodiment, the game system 1 has a configuration including two display devices. Note that in other embodiments, the game system 1 may include at least one display device. The game system 1 may include only one sound output section (speaker), or no sound output section.

In the game system 1, the game device 2 performs an information process (game process) in accordance with an input made on the terminal device 3, and an image (game image) obtained as a result of the information process is displayed on the terminal device 3 and/or the television 4. Thus, in the present embodiment, the game system 1 has a configuration where the input function, the information processing function and the display function are implemented by a plurality of devices. Note that in other embodiments, the game system 1 may be configured with a single information processing device (e.g., a portable information processing device) capable of these functions. In other embodiments, the function of the game device 2 may be implemented by a plurality of devices. For example, in other embodiments, at least some of the information processes performed by the game device 2 may be distributed among a plurality of devices capable of communicating together via a network (wide area network and/or local network). At least some of the information processes performed by the game device 2 may be performed by the terminal device 3.

2. Outline of Game Process

Figure 2:
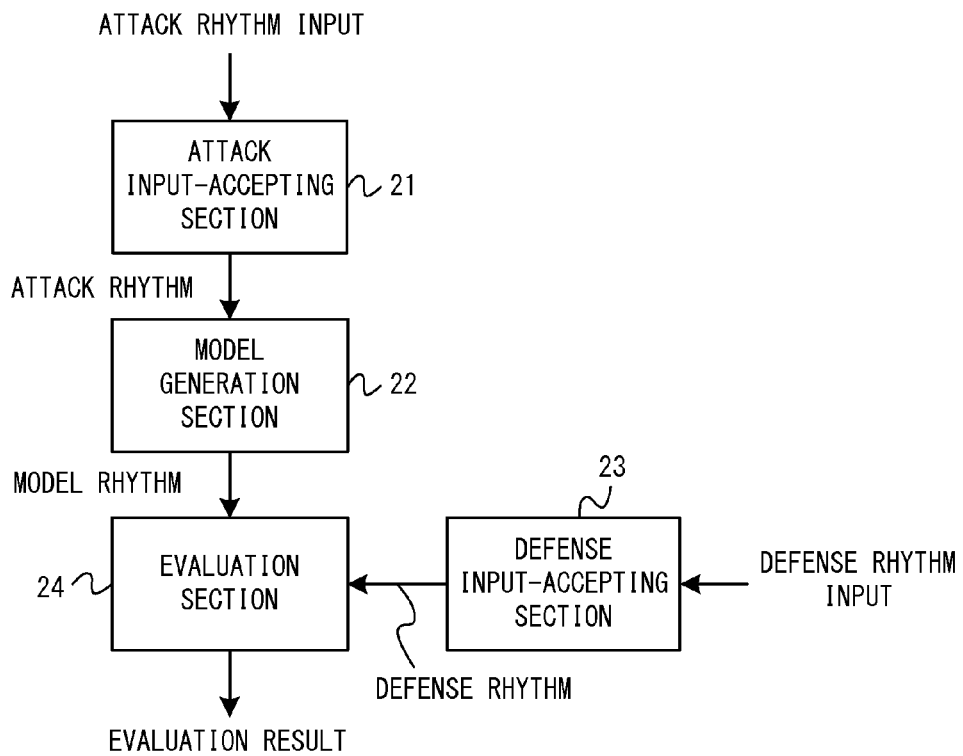
FIG. 2 is a functional block diagram showing an example of a functional configuration of the game system.
Figure 3:
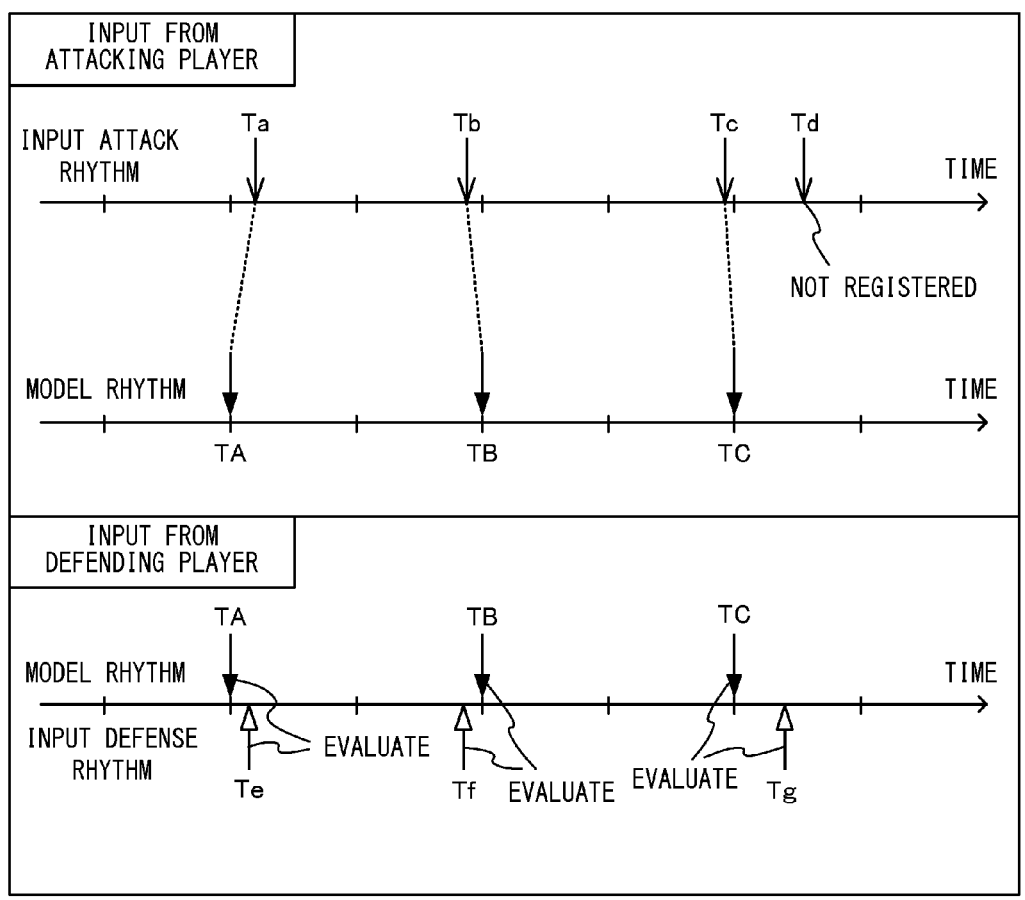
FIG. 3 is a diagram showing an example of a rhythm input from the attacking player and that from the defending player.

Referring now to FIGS. 2 and 3, the outline of the game process performed in the present embodiment will be described. The game process of the present embodiment is of a game where a player makes a rhythm input, commonly called a music game or rhythm game. In the present embodiment, music is played during an input period, and the player inputs a rhythm to the music. The game system 1 evaluates the input-making skills in terms of the timing of the input, and presents the evaluation result (scores or a special effect).

Note that a "rhythm input" refers to an input such that a certain rhythm is formed based on the input timing thereof. Although it is typical with a rhythm game that a rhythm to the music being played is formed by a rhythm input, the rhythm formed by a rhythm input may be any rhythm in the present specification. That is, a "rhythm input" means any one or more input which is made within a predetermined input period. Note that in the game, the rhythm made by a rhythm input is evaluated. Therefore, a rhythm input can be said to be an input at least of which the timing is evaluated in the game.

In the present embodiment, the game is played by two players. Specifically, the game of the present embodiment is of a format where two players complete against each other, and can therefore be said to be a versus-type rhythm game. In the present embodiment, one player makes a rhythm input as an attacking player and the other player makes a rhythm input as a defending player. In the present embodiment, the gameplay is based on how well the defending player can follow along to the rhythm input made by the attacking player (the model rhythm based on the rhythm input), the details of which will be described later.

FIG. 2 is a functional block diagram showing a functional configuration of the game system 1. As shown in FIG. 2, the game system 1 includes an attack input-accepting section 21, a model generation section 22, a defense input-accepting section 23, and an evaluation section 24. In the present embodiment, the attack input-accepting section 21 and the defense input-accepting section 23 are implemented by the terminal device 3. The model generation section 22 and the evaluation section 24 are implemented by the game device 2.

The attack input-accepting section 21 accepts a rhythm input made by the attacking player. Hereinafter, a rhythm input made by the attacking player will be referred to as an "attack rhythm input", and a rhythm formed by the rhythm input as an "attack rhythm". The attack input-accepting section 21 accepts the attack rhythm input during a predetermined input period. Note that in the present embodiment, a predetermined piece of music (song) is played during the input period, and the attacking player inputs a rhythm to the music.

FIG. 3 is a diagram showing an example of a rhythm input from the attacking player and that from the defending player. In the example illustrated in FIG. 3, the attacking player makes an input at timings (points in time) Ta, Tb, Tc and Td during the input period for the attacking player. That is, the attack input-accepting section 21 accepts an attack rhythm input composed of inputs at these four timings.

The model generation section 22 generates a model rhythm based on the attack rhythm (attack rhythm input). A model rhythm is a rhythm to be the model for the defending player (which the defending player tries to follow along). A model rhythm may be generated by any method based on the attack rhythm. In the present embodiment, a model rhythm is generated by correcting, as necessary, an attack rhythm so as to conform with a predetermined rhythm. Specifically, a model rhythm is generated so that each timing of the model rhythm coincides with any of one or more basic timings predetermined within the input period. Note that a basic timing refers to a timing that forms the basis for the timings of the model rhythm. In FIG. 3, each scale mark on the time axis is a basic timing. Note that the details of the method of generating a model rhythm will be described later.

In the example of FIG. 3, the timings Ta, Tb and Tc of the attack rhythm are corrected to timings TA, TB and TC, respectively. Note that in the present embodiment, if a timing of an attack rhythm is excessively off any basic timing, the timing will not be registered in the model rhythm, the details of which will be described later. That is, as shown in FIG. 3, the timing Td in the attack rhythm is not registered in the model rhythm (there is no timing in the model rhythm corresponding to the timing Td). As a result, a model rhythm is generated composed of timings TA, TB and TC. Note that the model generation section 22 presents the generated model rhythm to the players. In the present embodiment, during the input period for the defending player, an image representing the model rhythm is displayed on the terminal device 3 and the television 4.

Once the input period for the attacking player is over, the defense input-accepting section 23 accepts a rhythm input from the defending player. Hereinafter, a rhythm input made by the defending player will be referred to as a "defense rhythm input", and a rhythm formed by the rhythm input as a "defense rhythm". The defense input-accepting section 23 accepts a defense rhythm input during a predetermined input period, which is after the completion of the input period for the attacking player. In the present embodiment, the defending player is challenged to input a rhythm so as to match the model rhythm (the rhythm input by the attacking player). Note that during the input period for the defending player, the same piece of music is played as that played during the input period for the attacking player.

The evaluation section 24 evaluates the defense rhythm input using as a reference the model rhythm. The method of evaluation may be any method, and may be similar to those of conventional music games (rhythm games). In the present embodiment, it is determined whether each timing of the defense rhythm coincides with that of the model rhythm (whether the defense rhythm input is successively following along to the model rhythm). In the example shown in FIG. 3, the defense rhythm includes timings Te, Tf and Tg. Therefore, the evaluation section 24 determines whether the timings Te, Tf and Tg of the defense rhythm coincide with the timings TA, TB and TC of the model rhythm, respectively.

The evaluation section 24 makes an evaluation based on these determination results. In the present embodiment, a failure of the defense rhythm input to successfully follow along to the model rhythm results in a favorable evaluation for the attacking player, thereby adding points to the attacking player's score. On the other hand, the defense rhythm input successfully following along to the model rhythm results in a favorable evaluation for the defending player, thereby not adding points to the attacking player's score.

The evaluation section 24 presents the evaluation result to the players. For example, the evaluation section 24 may display scores or a special effect depending on the evaluation result.

As described above, in the present embodiment, a model rhythm is generated based on a first rhythm input (attack rhythm input) made by the first player (attacking player). Then, a second rhythm input (defense rhythm input) made by the second player (defending player) is evaluated using as a reference the model rhythm. Thus, one player inputs a rhythm to be a model, and the other player makes an input to follow along to the model rhythm. In the present embodiment, the model rhythm itself is input by a player, which results in an increased degree of freedom, hence an increased variation, of the model rhythm. Thus, it is possible to provide a game with a higher playability, of which the players will not easily get bored.

In the present embodiment, a plurality of players can enjoy a versus-type rhythm game. That is, in the present embodiment, where the defending player tries to follow along to a model rhythm based on a rhythm input of the attacking player, the attacking player and the defending player can compete against each other for their skills in the rhythm input operation. For example, the attacking player and the defending player can compete against each other for their operation skills at a high level by alternately inputting rhythms that are complicated and difficult to input, while beginning players can also compete against each other for their operation skills by alternately inputting rhythms that are easy to input. Thus, in the present embodiment, players can be given types of enjoyment which no conventional rhythm games had.

In the present embodiment, a model rhythm is generated by correcting an attack rhythm (as necessary). Here, the game system 1 may use the rhythm input by the first player (attacking player), as it is, as the model rhythm. Note however that the first player will then be allowed to make inputs at random timings, ignoring the basic timings (or the rhythm of the music), which will be hard to follow along to. This will make it excessively difficult for the defending player to follow along to the model rhythm, detracting from the game balance, resulting in a game with a poor playability. It will also contradict to the fundamental idea of rhythm games, i.e., "inputting a rhythm to the music".

In view of this, in the present embodiment, the model generation section 22 generates a model rhythm in such a manner that each timing of the model rhythm coincides with any of one or more basic timings predetermined within a predetermined input period (see FIG. 3). This prevents a model rhythm generated based on an attack rhythm input from becoming too hard, and improves the playability of the game. Where a piece of music is played during the input period, basic timings can be set appropriately to the music, thereby allowing players to experience the type of joy inherent to rhythm games, i.e., "inputting a rhythm to the music".

3. Various Processes of Game Process

Various processes included in the game process of the present embodiment will now be described in detail.

(3-1) Flow of Game

In the present embodiment, two players play as an attacking player and a defending player alternately in the game. That is, after the first player first makes a rhythm input as the attacking player and the second player makes a rhythm input as the defending player, they switch their roles with each other, whereby the second player makes a rhythm input as the attacking player and the first player makes a rhythm input as the defending player. Note that in the present embodiment, each player plays as the attacking player once and as the defending player once in each turn. Then, two turns make up one round, and the first to win three rounds wins the match. Note that any method may be employed for deciding who is the winner, and the winner may be determined for example by the total points won over a predetermined number of rounds.

As described above, in the present embodiment, after the process described above in "[2. Outline of game process]", the game system 1 performs the same process again while switching around the attacking player and the defending player. That is, after evaluating the second rhythm input made by the second player using as a reference the model rhythm based on the first rhythm input made by the first player, the attack input-accepting section 21 further accepts a third rhythm input from the second player. The model generation section 22 further generates and presents a model rhythm based on the third rhythm input. After the model rhythm based on the third rhythm input is generated, the defense input-accepting section 23 further accepts a fourth rhythm input made by the first player. The evaluation section 24 evaluates the fourth rhythm input using as a reference the model rhythm based on the third rhythm input. As described above, since each player can play both as the attacking player and as the defending player, it is possible to further improve the playability of the game.

Note that the game flow (how the game progresses) of the present embodiment is merely illustrative, and any other game flow may be employed. In other embodiments, one player may play only as the attacking player (who generates the model rhythm), and the other play only as the defending player.

In the present embodiment, the game system 1 plays a piece of music (song) during an input period in which an attack rhythm input is accepted and during an input period in which a defense rhythm input is accepted. Then, the player can make a rhythm input to the music, which makes it easier to make an input and thereby improves the playability of the game. Note that the music to be played may be determined by any manner, e.g., a player may be allowed to choose from a predetermined collection of pieces of music, or a piece of music may be selected randomly from such a collection. In the present embodiment, the same piece of music is played during the input period for the attacking player and during the input period for the defending player so as to assist the defending player in following along to the model rhythm.

In the present embodiment, before the input period for the attacking player, the game system 1 plays, for preview, the piece of music to be played during the input period for the attacking player. Thus, the attacking player can think about the rhythm to input before the start of the input period for the attacking player.

(3-2) Interface

Figure 4:
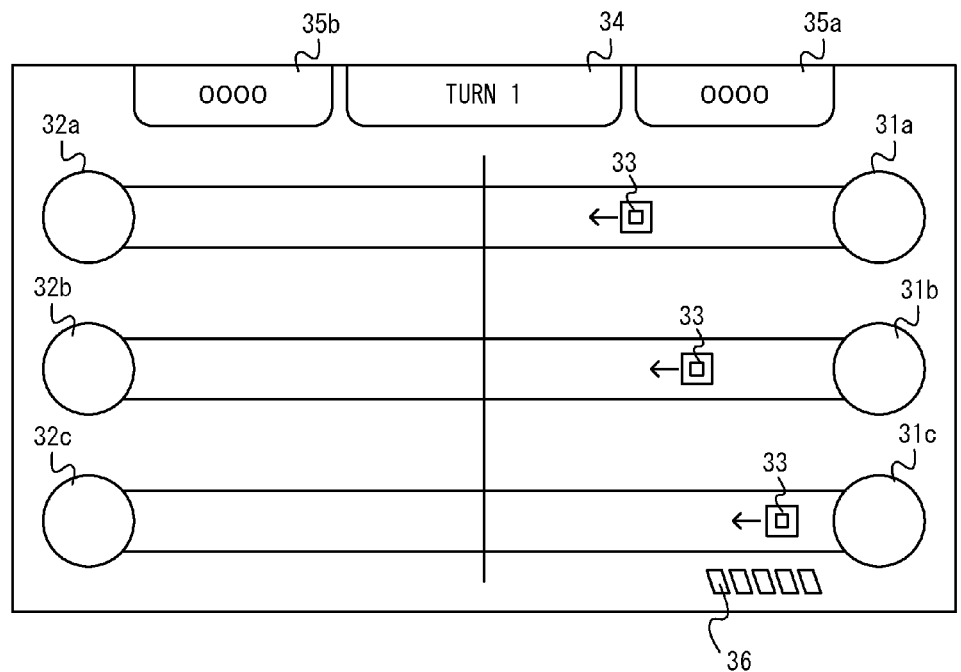
FIG. 4 is a diagram showing an example of a game image displayed on a terminal device.
Figure 5:
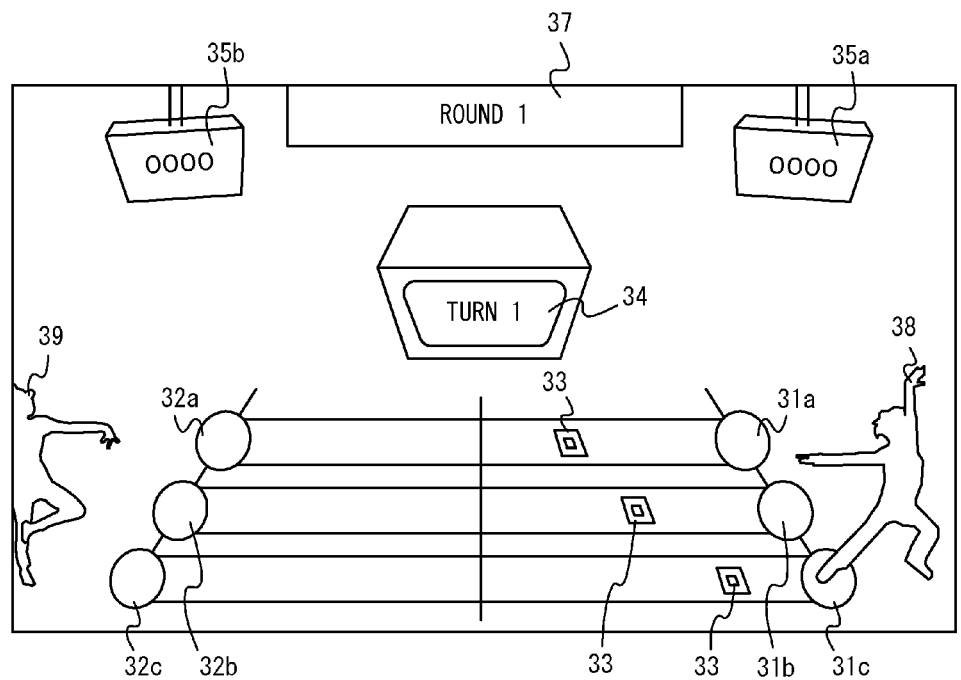
FIG. 5 is a diagram showing an example of a game image displayed on a television.

Next, an interface to be used in the present embodiment will be described. FIG. 4 is a diagram showing an example of a game image to be displayed on the terminal device 3. FIG. 5 is a diagram showing an example of a game image to be displayed on the television 4. Although there are no limitations on the input method to be employed for playing the game and the content of the game image, the game is played using an input method as follows and game images as follows are displayed, for example, in the present embodiment.

As shown in FIG. 4, button images 31a to 31c and 32a to 32c are displayed on the LCD 13 of the terminal device 3. Button images are images to be touched by the player for making a rhythm input. That is, in the present embodiment, the touch panel 15 of the terminal device 3 is used for making a rhythm input. Note that a rhythm input may be made by any method. For example, a rhythm input may be made by an operation of pressing buttons on the terminal device 3, or by an operation of moving the terminal device 3 itself.

The button images 31a to 31c are provided for one of the two players (the first player) and the button images 32a to 32c for the other player (the second player). Thus, in the present embodiment, two players make rhythm inputs both using a single touch panel 15. Therefore, as shown in FIG. 4, the screen area of the LCD 13 is generally divided into an area for the first player and another area for the second player. In FIG. 4, the right-hand side of generally the center of the screen is the area for the first player, and the left-hand side is the area for the second player.

As described above, in the present embodiment, the game system 1 (the game device 2) accepts as the first rhythm input an input from the terminal device 3, which is an input device, and further accepts as the second rhythm input an input from the same input device as that for the first rhythm input. Therefore, according to the present embodiment, a plurality of players can play the game with a single input device (there is no need to provide a plurality of input devices). In the present embodiment, since a rhythm input is made by using a touch panel, it is easy for a player to make a rhythm input while looking at the game image.

As shown in FIG. 4, in the present embodiment, three button images are provided for each player, as button images used for making a rhythm input. That is, the game system 1 (the attack input-accepting section 21 and the defense input-accepting section 23) accepts three different inputs from each player as the rhythm input. Note that in the present embodiment, an input on the button image 31a is equivalent to an input on the button image 32a, and the button images 31a and 32a are called the "first button image". Similarly, the button images 31b and 32b, which are equivalent to each other, are called the "second button image", and the button images 31c and 32c as the "third button image". In the present embodiment, an evaluation is made based on the timing at which a rhythm input is made and the type of the input (the type of the button image on which the input has been made), the details of which will be described later.

Note that the game system 1 outputs a predetermined sound effect (input sound) in response to an input on a button image. The sound effect (the type and/or pitch, etc., of the sound effect) may vary depending on the type of the input (the type of the button image).

As shown in FIG. 4, rhythm images 33 are displayed on the LCD 13 of the terminal device 3. The rhythm images 33 are images representing the model rhythm. That is, when an attack rhythm input is made on one of the button images (the button images 31a to 31c in FIG. 4) for the attacking player, a rhythm image 33 appears at the position of the button image on which the input has been made. Note that each rhythm image 33 appears at a timing of the model rhythm which is generated based on the attack rhythm input (i.e., at a timing that is obtained by correcting the actual input timing as necessary). After appearing at the position of the button image, the rhythm image 33 moves toward the area for the defending player (see arrows shown in FIG. 4) and moves to the button image for the defending player. Thus, one or more rhythm images 33 together represent a model rhythm.

The rhythm images 33 move at such a speed that they arrive at the positions of the button images for the defending player at least after the completion of the input period for the attacking player. For example, the rhythm images 33 may move at such a speed that they arrive in the area for the defending player after the completion of the input period for the attacking player. During the input period for the defending player, the defending player makes an input on a button image at a timing at which each rhythm image 33 arrives at the position of the button image. That is, a rhythm image 33 can be said to be an image representing the timing at which the defending player is supposed to make a rhythm input.

Note that after switching between attack and defense, rhythm images appear at the positions of the button images within the area for the new attacking player, and move to the button images within the area for the new defending player. Therefore, even when players switch between attack and defense, the area in which each player makes inputs does not change, and the players can therefore play the game without having to change positions at which they hold the terminal device 3.

As described above, the game system 1 displays rhythm images 33 representing a model rhythm on the display device. Therefore, a player can check the model rhythm, thereby making it easier to make a defense rhythm input. Where rhythm images 33 are displayed on the screen, which is provided together with the touch panel 15 used for making rhythm inputs, as in the present embodiment, players can more easily make rhythm inputs.

As shown in FIG. 4, a turn count image 34, score images 35a and 35b, and an input count image 36 are displayed on the LCD 13 of the terminal device 3. The turn count image 34 indicates the current turn number. The score images 35a and 35b indicate the scores of the two players. Now, in the present embodiment, there is a limit to the number of times a player can make an attack rhythm input for each input period (the details of which will be described later). The input count image 36 indicates the remaining number of times the player can make an attack rhythm input.

As shown in FIG. 5, the images 31 to 35 are displayed also on the television 4, as they are on the terminal device 3. Moreover, a round count image 37 and character images 38 and 39 are displayed on the television 4. The round count image 37 indicates the current round number. The character images 38 and 39 represent the player characters of the players. As shown in FIG. 5, a player character may be displayed that poses in response to each input made on a button image.

As described above, in the present embodiment, the game system 1 displays rhythm images 33 representing a model rhythm on the screen (the LCD 13) provided together with the touch panel 15, and also on another display device (the television 4) separate from the terminal device 3. Thus, in the present embodiment, since a game image including rhythm images is displayed also on the screen (the television 4) other than the screen on which touch inputs are made, it is possible to present a game image in an easy-to-view manner for the players. It is also possible to present a game image in an easy-to-view manner for other people watching the game.

In the present embodiment, content (the images 37 and 38) different from that displayed on one display device (the terminal device 3) on which rhythm inputs are made is displayed on another display device (the television 4). Therefore, the amount of content to be displayed on one screen can be reduced, whereby it is possible to present the game image in an easy-to-view manner.

(3-3) Model Rhythm Generating Process

Figure 6:
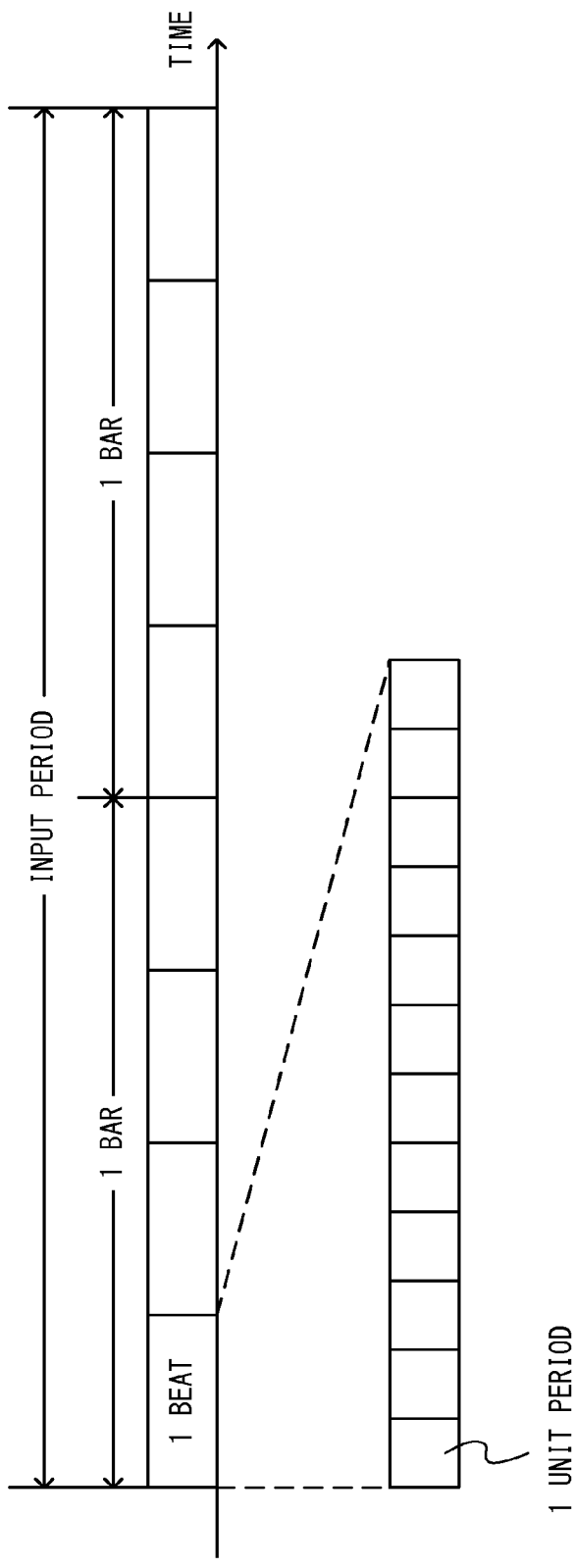
FIG. 6 is a diagram showing an example of a configuration of an input period.

Now, referring to FIGS. 6 to 9, the model rhythm generating process will be described. First, the configuration of the input period will be described. While the input period may have any configuration, the input period is configured as shown in FIG. 6, for example, in the present embodiment. FIG. 6 is a diagram showing an example of a configuration of the input period. As shown in FIG. 6, in the present embodiment, one input period is set to have a length of two bars. Each bar is set to have a length of four beats. The length of one beat is equally divided into twelve unit periods.

Figures 7, 8:
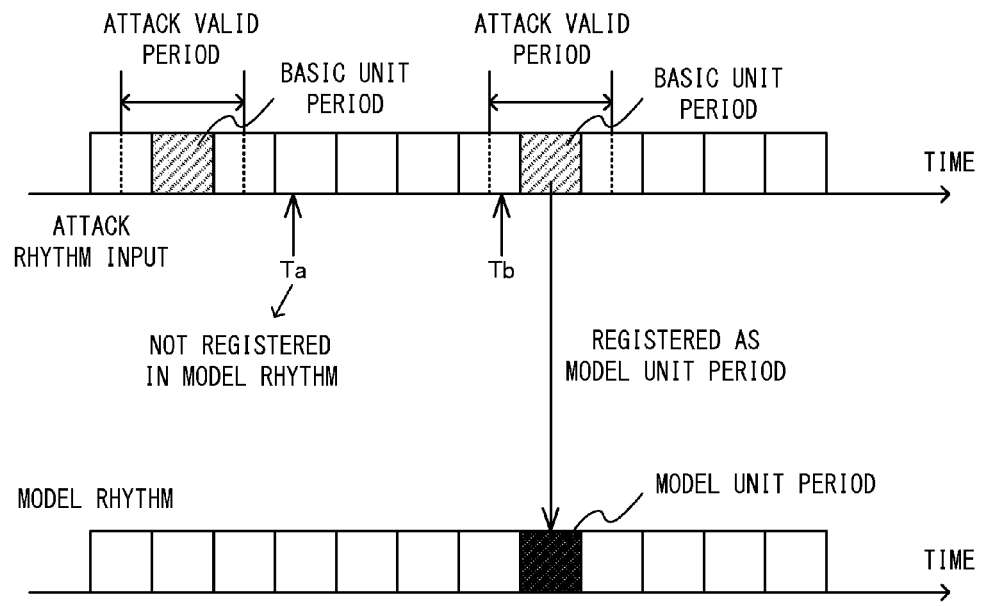
FIG. 7 is a diagram showing an example of a method for correcting a timing of an attack rhythm to a timing of a model rhythm.
FIG. 8 is a diagram showing an example of information which is registered as a model rhythm.

Next, a method for generating a model rhythm will be described. As described above, in the present embodiment, a model rhythm is generated by correcting an attack rhythm. FIG. 7 is a diagram showing an example of a method for correcting a timing of an attack rhythm to a timing of a model rhythm. Note that in FIG. 7, each rectangular block represents the unit period described above. Each hatched rectangular block represents a unit period corresponding to a basic timing (referred to as a basic unit period). In FIG. 7, a black rectangular block represents a model unit period to be described later.

In the present embodiment, basic timings are set at regular intervals of a predetermined period (see FIG. 3). That is, the interval between basic timings is constant in one input period. For example, in FIG. 7, the second and the eighth of the twelve unit periods, accounting for one beat, are set as basic unit periods, i.e., at intervals of five unit periods. Note that in other embodiments, the interval between basic timings does not have to be constant. The number of basic timings and the interval therebetween in one input period may be set in accordance with the music to be played during the input period so that they are in accordance with the music to be played.

In the present embodiment, a attack valid period is set based on a basic timing (see FIG. 7). An attack valid period is a period based on which it is determined whether an attack rhythm input is valid (whether it is to be registered as a timing of a model rhythm). As shown in FIG. 7, an attack valid period is set so as to include a basic unit period. Specifically, an attack valid period is made up of a basic unit period and a predetermined period of time before and after the basic unit period. The length of the predetermined period may be set in any manner. The length may be set in advance, or may be set so as to change depending on the genre of the music to be played during the input period, the difficulty level of the game, and the like.

When the attacking player makes an attack rhythm input, the game system 1 obtains information representing the timing of the input and the type of the input. Then, it is determined whether the timing of the input is within the attack valid period. In the present embodiment, this determination is performed in response to an input being made (each time an input is made). Note that in other embodiments, the determination may be performed once for a plurality of inputs after the completion of the input period for the attacking player.

If it is determined in this determination that the timing of the attack rhythm is within the attack valid period, a timing of the model rhythm is set based on this timing. For example, since an input made at the timing Tb shown in FIG. 7 is within the attack valid period, a timing of the model rhythm is set based on this input. In the present embodiment, a basic timing (the right-hand side basic unit period shown in FIG. 7) closest to the timing of the attack rhythm (the timing Tb shown in FIG. 7) is set as a timing of the model rhythm. Hereinafter, a basic unit period that has been set as a timing of the model rhythm will be referred to as a "model unit period". That is, if an input is made at a timing within an attack valid period, a basic unit period corresponding to the attack valid period (a basic unit period included within the attack valid period) is set as a model unit period (see FIG. 7).

When setting a timing of the model rhythm, the game system 1 sets the type of an input that should be made at the timing of the model rhythm, based on the type of the input in the attack rhythm input. Specifically, the game system 1 stores, as information representing a model rhythm, information representing each timing of the model unit period and the type of the attack rhythm input corresponding to the model unit period (one of the first to third button images). That is, in the model rhythm generating process, the game system 1 sets each timing of the model rhythm associated with the type of an input that should be made at that timing. FIG. 8 is a diagram showing an example of information which is set as a model rhythm. As shown in FIG. 8, information representing a model rhythm is information in which type information and timing information are associated with each other for each input. The type information represents the type of an input made in the input period (herein, one of the first to third button images). The timing information represents the timing of the input (herein, the unit period (basic unit period) corresponding to the timing). In the present embodiment, in the model rhythm generating process, information as described above is stored in the memory of the game device 2.

As described above, in the present embodiment, the game system 1 generates a model rhythm by correcting the timing of each attack rhythm input so as to coincide with any of the basic timings (FIG. 7). Thus, it is possible to easily generate a model rhythm that reflects attack rhythm inputs and that is in conformity with basic timings.

On the other hand, if it is determined in this determination that a timing of an attack rhythm input is outside the attack valid period, the timing of the attack rhythm input is not registered as a timing of the model rhythm. That is, when an attack rhythm input is made at a timing outside the attack valid period, no timing is set in the model rhythm. For example, an input made at the timing Ta shown in FIG. 7 is outside the attack valid period, and is therefore not registered in the model rhythm.

As described above, in the present embodiment, the game system 1 excludes any input timing (e.g., the timing Ta shown in FIG. 7) that falls outside a predetermined period including a basic timing therein (an attack valid period), of the input timings of an attack rhythm input. Then, the game system 1 generates a model rhythm based on the remaining input timings (e.g., the timing Tb shown in FIG. 7). Therefore, according to the present embodiment, it is possible to exclude any input, of the attack rhythm inputs, that does not conform with the rhythm composed of basic timings. That is, the game system 1 is capable of generating a model rhythm that is in conformity with the rhythm composed of basic timings (e.g., in conformity with the rhythm of the music being played).

By excluding input timings that are off any basic timing, it is possible to improve the playability of the game. That is, while it is preferable for the attacking player to make a rhythm input that is difficult for the defending player to follow along to, if the attacking player tries to make unreasonably difficult rhythm inputs, some inputs will be excluded, resulting in a rather simple basic rhythm. That is, the attacking player, while taking his/her input skills into consideration, makes reasonable rhythm inputs. This improves the strategic aspect of the game, and thus the playability of the game.

In the present embodiment, there is a limit to the number of attack rhythm inputs that the attacking player can make for each input period. In the present embodiment, the upper limit to the number of inputs that can be made for each input period is set to a predetermined number (e.g., eight). Thus, by setting an upper limit to the number of attack rhythm inputs to be made, it is possible to prevent attack rhythm inputs from becoming excessively complicated. Note that the upper limit to the number of times may be varied depending on the genre of the music played during the input period, the difficulty level of the game, etc. If the number of attack rhythm inputs is equal to the upper limit and if there is no input error (all the inputs are within the attack valid period), bonus points may be additionally given in the process (to be described later) of adding points to the score of the attacking player.

Note that the correction of the input timing of an attack rhythm input during the basic rhythm generating process is different from an input timing becoming shifted by a minute amount of time off of the actual timing due to the input device (touch panel) detecting inputs at a predetermined sampling interval. The sampling interval is shorter than the unit period described above, and the attack valid period is longer than the sampling interval.

(3-4) Evaluation Process

Figure 9:
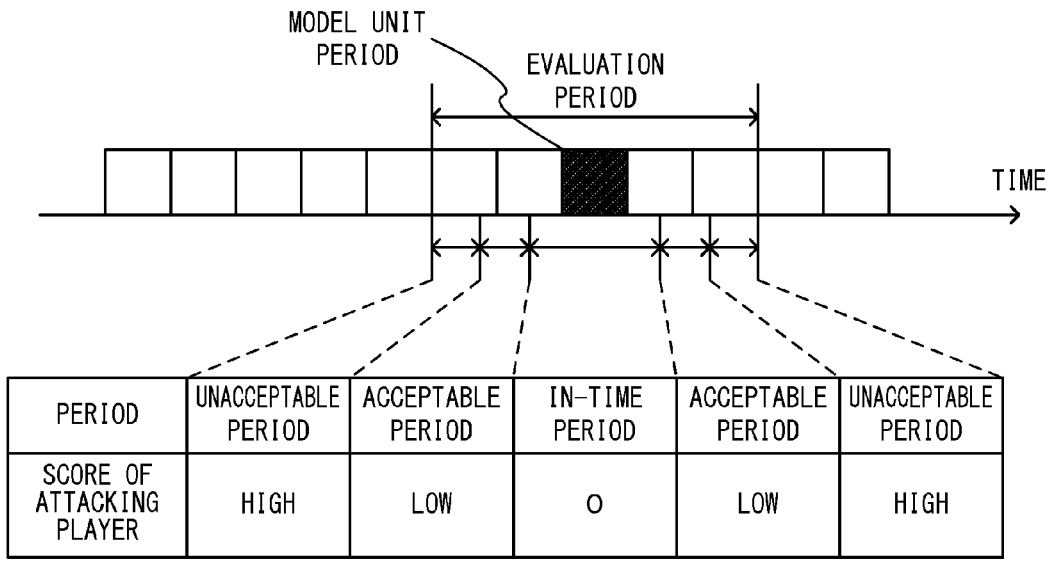
FIG. 9 is a diagram showing an example of a method for evaluating a defense rhythm input using as a reference a model rhythm.

Referring now to FIG. 9, an evaluation process for evaluating a defense rhythm input using as a reference a model rhythm will be described. The specific method for evaluating a rhythm input made by a player (a defense rhythm input in the present embodiment) using as a reference a model rhythm may be any method, and may be similar to that of a conventional rhythm game. In the present embodiment, the evaluation is done by a method as follows, for example.

FIG. 9 is a diagram showing an example of a method for evaluating a defense rhythm input using as a reference a model rhythm. Note that in FIG. 9, the black rectangular block represents a model unit period.

As shown in FIG. 9, in the present embodiment, an evaluation period is set based on a model unit period representing a timing of a model rhythm. The evaluation period is a period used for evaluating a defense rhythm input. In the present embodiment, the evaluation period includes an in-time period, acceptable periods, and unacceptable periods (see FIG. 9).

The in-time period is a period in which the input timing is appropriate, i.e., where it is determined that an input has been made at a timing that coincides with a basic timing. As shown in FIG. 9, the in-time period is set so as to include the model unit period. In the present embodiment, the in-time period is set to have the same length as that of the attack valid period described above. Therefore, the conditions on which the attacking player can set a model rhythm can be made equivalent to those on which the defending player can make an input at an appropriate timing to the model rhythm, whereby it is possible to provide a game with a game balance and a high playability.

The acceptable period is a period in which it is determined that the input has been made at a timing that generally coincides with a basic timing, though it is not as good a timing as the in-time period. As shown in FIG. 9, the acceptable period is set to include a predetermined length of period before and after the in-time period. The unacceptable period is a period in which it is determined that the input has not been made at a timing that coincides with a basic timing. As shown in FIG. 9, the unacceptable period is set to include a predetermined length of period before and after the acceptable period.

Note that the lengths of the in-time period, the acceptable period and the unacceptable period may be set in any manner. Each of these lengths may be pre-set in a fixed manner, or may be set depending on the genre of the music to be played or the difficulty level of the game.

When the defending player makes a defense rhythm input, the game system 1 determines whether the timing of the input is included within any of those periods in the evaluation period. If it is determined that the timing of a defense rhythm input is within the unacceptable period, more points are given to the attacking player as shown in FIG. 9 (meaning that the defending player has failed to defend the attack). If it is determined that the timing of the defense rhythm input is within the acceptable period, fewer points are given to the attacking player (meaning that the defending player has defended the attack more or less successfully). If it is determined that the timing of the defense rhythm input is within the in-time period, no points are given to the attacking player (meaning that the defending player has successfully defended the attack). Note that if no input is made during the evaluation period, more points are given to the attacking player as in the case of the unacceptable period. If an input is made outside the evaluation period, more points may be given to the attacking player, points may be subtracted from the score of the defending player, or points may be given to neither player. Note that the evaluation result when an input is made outside the evaluation period may be the same as that when an input is made within the unacceptable period (i.e., the unacceptable period does not need to be set as an evaluation period).

As described above, the game system 1 sets timings in a model rhythm based on attack rhythm inputs, and makes an evaluation through comparison between a timing in the model rhythm and the timing of a defense rhythm input. Thus, it is possible to easily evaluate defense rhythm inputs using as a reference the model rhythm.

In the present embodiment, the game system 1 accepts a plurality of different inputs from each player. Therefore, the game system 1 sets a timing of a model rhythm, and the type of an input that should be made at that timing, as described above in "(3-3) Model rhythm generating process". Then, in the evaluation process, the comparison between the timing in the model rhythm and the timing of the defense rhythm input is made separately for each type of input. That is, the determination whether the timing of each defense rhythm input is included within any of those periods in the evaluation period is made separately for each type of input. For example, when an input is made on the first button image 32a as a defense rhythm input, the determination described above is made by using an evaluation period corresponding to the model unit period associated with the first button image 31a. Thus, where the comparison between a timing of the model rhythm and a timing of the defense rhythm input is made separately for each type of input, the player makes a rhythm input while taking into consideration the type of input as well as the timing of input. Then, it is possible to increase the variation of inputs, and to improve the playability of the game.

As described above, in the present embodiment, as an evaluation process for a defense rhythm input, the game system 1 performs a process of calculating and presenting the score of each player. Note that the evaluation process may be any process, and may be, for example, a process of presenting, to the players, a special effect and/or sound in accordance with the evaluation.

4. Specific Example of Game Process (4-1) Data Used in Game Process

Figure 10:
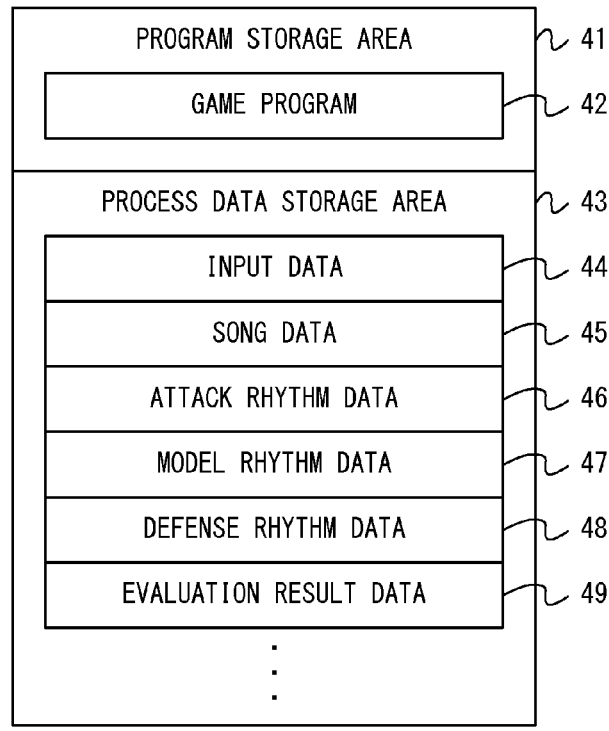
FIG. 10 is a diagram showing an example of a data area which is provided in a memory of a game device.

Referring now to FIGS. 10 and 11, an example of a specific game process performed on the game system 1 (the game device 2) in the present embodiment will be described. FIG. 10 is a diagram showing an example of a data area set in the memory of the game device 2 in the present embodiment. As shown in FIG. 10, the memory of the game device 2 includes a program storage area 41 and a process data storage area 43. Note that the memory may store, in addition to data shown in FIG. 10, images to be output to the display device, or image data, etc., used for generating the images.

A game program 42 is stored in the program storage area 41. The game program 42 is a program to be executed by a computer (the control section 11) of the game system 1. Note that in the present embodiment, the game program 42 is stored in the storage section 12. At an appropriate point in time, a part or whole of the game program 42 is loaded from the storage section 12, stored in the memory of the control section 11, and executed by the CPU. Note that a part or whole of the game program 42 may be stored in advance in the game device 2 (e.g., as a library).

The process data storage area 43 stores various data to be used in the game process (the information process shown in FIG. 11) to be performed by the game system 1. The process data storage area 43 stores input data 44, song data 45, attack rhythm data 46, model rhythm data 47, defense rhythm data 48, and evaluation result data 49.

The input data 44 is data representing an input made on an input section (the touch panel 15). In the present embodiment, the input data 44 represents an input position (touch position) on the touch panel 15.

The song data 45 is sound data of a piece of music (song) to be played during the input period. In the present embodiment, the song data 45 is stored, together with the game program 42, in the storage section 12, and is loaded onto the memory at an appropriate point in time. The game device 2 may store the song data 45 for a plurality of songs.

The attack rhythm data 46 represents a rhythm of the attack rhythm input. In the present embodiment, the attack rhythm data 46 represents sets of timing information and type information. The type information represents the type of the input made during the input period, and the timing information represents the timing of that input.

The model rhythm data 47 represents a rhythm of the model rhythm described above. In the present embodiment, the model rhythm data 47 represents sets of timing information and type information. The model rhythm data 47 represents such a set as described above for each timing included in the model rhythm.

The defense rhythm data 48 represents a rhythm of the defense rhythm input described above. In the present embodiment, the defense rhythm data 48 represents sets of timing information and type information, as does the attack rhythm data 46.

The evaluation result data 49 represents an evaluation result for the defense rhythm input. In the present embodiment, the evaluation result data 49 represents points given to the players.

(4-2) Flow of Game Process

Next, the detailed flow of the game process in the present embodiment will be described. FIG. 11 is a flow chart showing an example of the flow of the game process to be performed by the control section 11 (CPU) of the game device 2 in the present embodiment. In the present embodiment, when the game system 1 is started up, the CPU of the game device 2 initializes the memory, and loads the game program 42 from the storage section 12 onto the memory. Then, the CPU starts executing the game program 42.

Note that the flow chart shown in FIG. 11 shows the process to be performed while one player, as the attacking player, and another player, as the defending player, each perform one rhythm input operation. Thus, over the course of one turn, the series of processes of steps S1 to S13 shown in FIG. 11 is performed, and then the series of processes of steps S1 to S13 is performed again while the players switch between attack and defense. Moreover, in the present embodiment, as described above, the series of processes of steps S1 to S13 is repeated until either player wins three rounds. Note that the music to be played may be changed after every iteration of the series of processes of steps S1 to S13, after every turn, or after every round.

Note that the processes of the steps in the flow chart shown in FIG. 11 are merely illustrative, and the order of steps to be performed may be switched around, or other processes may be performed in addition to (or instead of) these steps, as long as similar results are obtained. While the present embodiment is described assuming that the processes of the steps of the flow chart are performed by the CPU, processes of some of the steps of the flow chart may be performed by a processor or a dedicated circuit other than the CPU.

In the present embodiment, first, in step S1, the CPU plays, for preview, the piece of music (song) to be played later in the following input period. That is, the CPU reads out the song data 45 from the memory and outputs the song data 45 to the terminal device 3 and/or the television 4. Note that during the playback of a song for preview, no inputs are accepted from either player. After the completion of the playback of the music for a length of time equal to the length of the input period, the process of step S1 ends, and the process of step S2 is performed.

In step S2, the CPU starts the input period for the attacking player. Specifically, the playback of the music is started. Then, the process loop of steps S3 to S8 is repeatedly performed until it is determined in step S8 to be described later that the input period for the attacking player has completed.

In step S3, the CPU accepts an attack rhythm input. That is, the CPU obtains operation data from the terminal device 3. Then, when an input is made on the touch panel 15, the CPU stores in the memory data representing the timing of the input and the type of the input, as the attack rhythm data 46. The CPU counts the number of inputs that have been made during the current input period. On the other hand, if no input is made on the touch panel 15, the CPU does not perform the process of storing the attack rhythm data 46. After the completion of step S3, the process of step S4 is performed.

In step S4, the CPU determines whether an attack rhythm input has been made. If the determination result of step S4 is affirmative, the process of step S4 is performed. On the other hand, if the determination result of step S4 is negative, the process of step S7 to be described later will be performed.

In step S5, the CPU determines whether the number of attack rhythm inputs that have been made in the single input period is less than or equal to the upper limit. If the determination result of step S5 is affirmative, the process of step S6 is performed. On the other hand, if the determination result of step S5 is negative, the process of step S7 to be described later will be performed.

In step S6, the CPU sets a timing of a model rhythm based on the attack rhythm input that has been made in step S3. The timing of the model rhythm is set by the method described above in "(3-3) Model rhythm generating process". Note that if the timing of the attack rhythm input is outside the attack valid period, as described above, no timing is set in the model rhythm. When a timing is set in the model rhythm, the CPU sets a timing of the model rhythm (a model unit period) based on the attack rhythm data 46 read out from the memory. The CPU adds data representing the timing which has been set and the type of the input to the model rhythm data 47 stored in the memory. After the completion of step S6, the process of step S7 is performed.

In step S7, the CPU displays a game image. That is, the CPU generates a game image as described above in "(3-2) Interface", and outputs the data of the game image to the terminal device 3 and the television 4. After the completion of step S7, the process of step S8 is performed.

In step S8, the CPU determines whether the input period for the attacking player has ended. If the determination result of step S8 is affirmative, the process of step S9 is performed. On the other hand, if the determination result of step S8 is negative, the process of step S3 described above is performed again.

Through the process loop of steps S3 to S8 described above, the model rhythm data 47 based on attack rhythm inputs is generated. That is, the model rhythm data 47 is stored in the memory, representing the timing and the type of each of the attack rhythm inputs which have been made during the input period.

After the completion of the process loop described above, the process of step S9 is performed. In step S9, the CPU starts the input period for the defending player. Specifically, the playback of the music (the same music as step S2) is started. Thereafter, the process loop of step S10 to S13 is repeatedly performed until it is determined in step S13 to be described later that the input period for the defending player has ended.

In step S10, the CPU accepts a defense rhythm input. That is, the CPU obtains operation data from the terminal device 3. Then, if an input has been made on the touch panel 15, the CPU stores in the memory data representing the timing of the input and the type of the input as the defense rhythm data 48. On the other hand, if no input has been made on the touch panel 15, the CPU does not perform the process of storing the defense rhythm data 48. After the completion of step S10, the process of step S11 is performed.

In step S11, the CPU evaluates the defense rhythm input using as a reference the model rhythm. That is, the CPU evaluates the defense rhythm input by a method as described above in "(3-4) Evaluation process". Note that in step S11, the evaluation process may be performed when a defense rhythm input is made and when the evaluation period ends, without performing the evaluation process at other points in time. Note that if no input is made during the evaluation period, a higher evaluation (score) may be given to the attacking player. When performing the evaluation process, the CPU reads out the model rhythm data 47 and the defense rhythm data 48 from the memory, and evaluates based on the readout data. Moreover, the CPU stores in the memory data representing the scores of the players, which have been calculated as a result of the evaluation, as the evaluation result data 49. After the completion of step S11, the process of step S12 is performed.

In step S12, the CPU presents the evaluation result (displays a game image). That is, the CPU generates a game image including the score images 35*a* and 35*b* representing the scores of the players, and outputs the data of the game image to the terminal device 3 and the television 4 (see "(3-2) Interface" described above). For example, if an input has been made within the evaluation period, an image representing the evaluation result for that input may be displayed, and if no input has been made during the evaluation period, an image representing the failure of defense may be displayed. After the completion of step S12, the process of step S13 is performed.

In step S13, the CPU determines whether the input period for the defending player has ended. If the determination result of step S13 is affirmative, the CPU ends the game process. On the other hand, if the determination result of step S13 is negative, the process of step S10 described above is performed again.

5. Variation (Variation Regarding Generation of Model Rhythm)

In the embodiment above, the game system 1 performs the process of setting a timing of a model rhythm by correcting a timing of an attack rhythm so as to coincide with a basic timing. Now, in other embodiments, the game system 1 may generate a model rhythm by changing the tempo of the attack rhythm in addition to (or instead of) the process above. For example, the game system 1 may further make a correction such that the tempo is changed of a model rhythm generated in a manner similar to the embodiment above. Note that in such a case, the input period for the attacking player will be different from the input period for the defending player. Where rhythm images are moved as in the embodiment above, the game system 1 may vary the moving speed of rhythm images. As described above, by generating a model rhythm by changing the tempo of the attack rhythm input, it is possible to adjust the difficulty level of the defense rhythm input and to improve the playability of the game. Note that in other embodiments, the game system may pause the music being played during the input period for the defending player, for example. This also allows for an adjustment of the difficulty level of the defense rhythm input, and for an improvement to the playability of the game.

In other embodiments, in the process of generating a model rhythm, the game system may vary the type of input in a model rhythm from the type of an attack rhythm input that has been made. For example, in the example of FIG. 4, consider a case where an input has been made on the first button image 31*a* as an attack rhythm input. In this case, the game system may generate a model rhythm in which a timing of the model rhythm corresponding to this timing of input is associated with another button image other than the first button image (a second or third button image). Then, the defending player will have to make an input of a different type from the attacking player, and it is thus possible to increase the difficulty level of the game.

In other embodiments, the game system may block the view of rhythm images 33 over a partial screen area, for example, in order to adjust the difficulty level of the game. FIG. 12 is a diagram showing an example of a game image according to a variation of the present embodiment. In FIG. 12, rhythm images 33 are hidden invisible under an image 51 over a predetermined area (in an area of the defending player in FIG. 12). Then, it will be difficult for the player to make defense rhythm inputs to the model rhythm. It is possible to adjust the difficulty level by changing the size of the image 51, for example. Alternatively, the game system 1 may display the image 51, when the game has been tied (e.g., when the two players are even at the same score after one round), to increase the difficulty level so that the game will likely be won by either player.

(Variation Regarding Genre of Game)

The genre of games to be played on the game system 1 is not limited to those called "music games (rhythm games)". The model rhythm generating process and the evaluation process of the present specification are applicable to games of any genres. In other embodiments, no music may be played during the input period for making rhythm inputs, and the processes described above may be applicable to games where inputs are made to the movement of a character displayed on the screen, for example.

(Variation Regarding Format of Multi-Player Gameplay)

The model rhythm generating process and the evaluation process of the present specification are not limited to a game of a format where two players compete against each other, but are applicable to any type of multi-player games. For example, where three or more players play the game, one player may play as the attacking player while the others play as the defending players, wherein the evaluation process is performed for each of the other players. In this case, the model rhythm generating process can be performed as it is in the embodiment above. The evaluation process may be performed as a process described in the embodiment above for each of the defending players.

The model rhythm generating process and the evaluation process are not limited to versus-type games, but are also applicable to games of the type where a plurality of players play the game in a cooperative manner. For example, the game system 1 may use the score to be given in accordance with a rhythm input made by a second player (defending player), as a common score among all the players, thereby realizing a game of a format in which a plurality of players play in a cooperative manner.

In other embodiments, a plurality of players may play with one another in a so-called "communication play". That is, players may play the game using terminal devices capable of communicating with one another via a network. Then, game processes may be performed on each terminal device, or on the server.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the embodiment above is applicable to, for example, a game program or a game device with the aim of, for example, providing a game with a high playability.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program to be executed by a computer of a game device which accepts inputs from a plurality of players to allow a game to progress, the game program instructing the computer to execute:
   accepting a first rhythm input made by a first player on a touch panel coupled to the game device, the first rhythm input including timings at which inputs are received on the touch panel;
   removing one or more inputs from the first rhythm input which are not within a predetermined range of a rhythm of music played during the period when the first rhythm input is made by the first player on the touch panel;
   generating a model rhythm based on the first rhythm input;
   displaying, on a display coupled to the game device, a representation of the generated model rhythm;
   while the representation of the generated model rhythm is displayed on the display, accepting a second rhythm input made by a second player on the touch panel coupled to the game device; and
   evaluating the second rhythm input using as a reference the model rhythm.

2. The storage medium according to claim 1, wherein the model rhythm is generated so that a timing of the model rhythm coincides with any of one or more basic timings predetermined within a predetermined input period.

3. The storage medium according to claim 2, wherein the model rhythm is generated by correcting a timing of the first rhythm input so that the timing coincides with any of the basic timings.

4. The storage medium according to claim 2, wherein of all the input timings of the first rhythm input, any input timing that is outside a predetermined period including a basic timing therein is excluded, and the model rhythm is generated based on one or more remaining input timings.

5. The storage medium according to claim 1, wherein the model rhythm is generated by changing at least a tempo of the first rhythm input.

6. The storage medium according to claim 1, wherein:
   a timing in the model rhythm is set based on the first rhythm input; and
   the evaluation is performed by comparing a timing in the model rhythm with a timing of the second rhythm input.

7. The storage medium according to claim 6, wherein:
   a plurality of types of inputs are accepted as the first rhythm input;
   a plurality of types of inputs are accepted as the second rhythm input;
   a timing in the model rhythm is set based on a timing of an input in the first rhythm input, and a type of an input to be made at the timing in the model rhythm is set based on a type of an input in the first rhythm input; and
   the comparison between a timing in the model rhythm and a timing of the second rhythm input is performed separately for each type of input.

8. The storage medium according to claim 1, wherein:
   a third rhythm input by the second player is further accepted after the evaluation of the second rhythm input using as a reference the model rhythm based on the first rhythm input;
   a model rhythm is further generated and presented based on the third rhythm input;
   a fourth rhythm input by the first player is further accepted after the model rhythm is generated based on the third rhythm input; and
   the fourth rhythm input is evaluated using as a reference the model rhythm based on the third rhythm input.

9. The storage medium according to claim 1, wherein the game program further instructs the computer to:
   before accepting the first rhythm input made by the first player on the touch panel, playing, for preview, a piece of music, selected by the first player, to be played during the input period of the first rhythm by the first player.

10. The storage medium according to claim 9, wherein displaying the representation of the generated model rhythm includes displaying an image representing the model rhythm on the display including the touch panel.

11. The storage medium according to claim 1, wherein displaying the representation of the generated model rhythm includes displaying an image representing the model rhythm on the display.

12. The storage medium according to claim 1, wherein the game program instructs the computer to further execute: playing music during an input period in which the first rhythm input is accepted, and during another input period in which the second rhythm input is accepted.

13. A game device for accepting inputs from one or more players to allow a game to progress, the game device comprising:
a display;
a touch panel; and
a processing system, comprising at least one processor, the processing system coupled to the touch panel and the display, and being at least configured to:
accept a first rhythm input by a first player on the touch panel;
generate a model rhythm based on the first rhythm input;
display, on a display coupled to the game device, a representation of the generated model rhythm;
while the representation of the generated model rhythm is displayed on the display, accept a second rhythm input by a second player on the touch panel; and
evaluate the second rhythm input using as a reference the model rhythm
wherein the first rhythm input by the first player includes a plurality of different types of inputs to the touch panel and the second rhythm input by the second player includes a plurality of different types of inputs to the touch panel, and wherein evaluating the second rhythm input by the second player includes comparing the timing of the second rhythm input to the timing of the model rhythm separately for each of the type of inputs in the second rhythm input by the second player.

14. The game device of claim 13, wherein the display includes the touch panel and the processing system is further configured to simultaneously display, on the display, a first set of button images for the first player to input the first rhythm and a second set of button images for the second player to input the second rhythm.

15. A game system for accepting inputs from a plurality of players to allow a game to progress, the game system comprising:
a display;
a first touch panel and a second touch panel; and
a processing system, comprising at least one processor, the processing system coupled to the display and the touch panels and being at least configured to:
accept a first rhythm input by a first player on the first touch panel, the first rhythm input including timings at which inputs are received on the first touch panel;
remove one or more inputs from the first rhythm input which are not within a predetermined range of a rhythm of music played during the period when the first rhythm input is made by the first player on the first touch panel;
generate a model rhythm based on the first rhythm input;
display, on the display, a representation of the generated model rhythm;
while the representation of the generated model rhythm is displayed on the display, accept a second rhythm input by a second player on the second touch panel; and
evaluate the second rhythm input using as a reference the model rhythm.

16. A game process method to be carried out in a game system for accepting inputs from a plurality of players to allow a game to progress, the game process method comprising:
accepting a first rhythm input by a first player on a touch panel of a game device, the first rhythm input including timings at which inputs are received on the touch panel;
removing one or more inputs from the first rhythm input which are not within a predetermined range of a rhythm of music played during the period when the first rhythm input is made by the first player on the touch panel;
generating a model rhythm based on the first rhythm input;
displaying, on a display, a representation of the generated model rhythm;
while the representation of the generated model rhythm is displayed on the display, accepting a second rhythm input by a second player on the touch panel of the game device or a touch panel of another game device; and
evaluating the second rhythm input using as a reference the model rhythm.

17. A game device for accepting inputs from one or more players to allow a game to progress, the game device comprising:
a display;
a touch panel; and
a processing system, comprising at least one processor, the processing system coupled to the touch panel and the display, and being at least configured to:
accept a first rhythm input by a first player on the touch panel, the first rhythm input including timings at which inputs are received on the touch panel;
remove one or more inputs from the first rhythm input which are not within a predetermined range of a rhythm of music played during the period when the first rhythm input is made by the first player on the touch panel;
generate a model rhythm based on the first rhythm input;
display, on a display coupled to the game device, a representation of the generated model rhythm;
while the representation of the generated model rhythm is displayed on the display, accept a second rhythm input by a second player on the touch panel; and
evaluate the second rhythm input using as a reference the model rhythm.

18. A non-transitory computer-readable storage medium storing a game program to be executed by a computer of a game device which accepts inputs from a plurality of players to allow a game to progress, the game program instructing the computer to execute:
accepting a first rhythm input made by a first player on a touch panel coupled to the game device;
generating a model rhythm based on the first rhythm input;
displaying, on a display coupled to the game device, a representation of the generated model rhythm;
while the representation of the generated model rhythm is displayed on the display, accepting a second rhythm input made by a second player on the touch panel coupled to the game device; and
evaluating the second rhythm input using as a reference the model rhythm,
wherein the first rhythm input by the first player includes a plurality of different types of inputs to the touch panel and the second rhythm input by the second player includes a plurality of different types of inputs to the touch panel, and wherein evaluating the second rhythm input by the second player includes comparing the timing of the second rhythm input to the timing of the model rhythm separately for each of the type of inputs in the second rhythm input by the second player.

19. A game system for accepting inputs from a plurality of players to allow a game to progress, the game system comprising:
a display;
a first touch panel and a second touch panel; and
a processing system, comprising at least one processor, the processing system coupled to the display and the touch panels and being at least configured to:
accept a first rhythm input by a first player on the first touch panel;
generate a model rhythm based on the first rhythm input;
display, on the display, a representation of the generated model rhythm;
while the representation of the generated model rhythm is displayed on the display, accept a second rhythm input by a second player on the second touch panel; and
evaluate the second rhythm input using as a reference the model rhythm,
wherein the first rhythm input by the first player includes a plurality of different types of inputs to the first touch panel and the second rhythm input by the second player includes a plurality of different types of inputs to the second touch panel, and wherein evaluating the second rhythm input by the second player includes comparing the timing of the second rhythm input to the timing of the model rhythm separately for each of the type of inputs in the second rhythm input by the second player.

20. A game process method to be carried out in a game system for accepting inputs from a plurality of players to allow a game to progress, the game process method comprising:
accepting a first rhythm input by a first player on a touch panel of a game device;
generating a model rhythm based on the first rhythm input;
displaying, on a display, a representation of the generated model rhythm;
while the representation of the generated model rhythm is displayed on the display, accepting a second rhythm input by a second player on the touch panel of the game device or a touch panel of another game device; and
evaluating the second rhythm input using as a reference the model rhythm,
wherein the first rhythm input by the first player includes a plurality of different types of inputs to the touch panel and the second rhythm input by the second player includes a plurality of different types of inputs to the touch panel, and wherein evaluating the second rhythm input by the second player includes comparing the timing of the second rhythm input to the timing of the model rhythm separately for each of the type of inputs in the second rhythm input by the second player.

* * * * *